July 24, 1962 H. W. FAEBER 3,045,585
LAMINATOR
Filed Nov. 29, 1957 5 Sheets-Sheet 1

INVENTOR
HARRY W. FAEBER
BY
his ATTORNEYS

July 24, 1962 H. W. FAEBER 3,045,585
LAMINATOR
Filed Nov. 29, 1957 5 Sheets-Sheet 4

INVENTOR.
HARRY W. FAEBER
BY
his ATTORNEYS.

July 24, 1962 H. W. FAEBER 3,045,585
LAMINATOR
Filed Nov. 29, 1957 5 Sheets—Sheet 5

INVENTOR.
HARRY W. FAEBER
BY
his ATTORNEYS

United States Patent Office 3,045,585
Patented July 24, 1962

3,045,585
LAMINATOR
Harry W. Faeber, Larchmont, N.Y., assignor to Time, Incorporated, New York, N.Y., a corporation of New York
Filed Nov. 29, 1957, Ser. No. 699,547
9 Claims. (Cl. 100—93)

This invention relates to printing plates and, more particularly, to a process and apparatus for producing a composite printing plate embodying a facing made of plastic composition bearing the printing surface and a metallic backing.

A principal object of the invention is to provide an improved method and apparatus for making a composite printing plate embodying a plastic facing and a metallic backing.

Another important object of the invention is to provide an improved method and apparatus for laminating a plastic facing and a metallic backing to produce a composite printing plate blank.

Generally, the present invention relates to a method and apparatus for laminating a plastic composition, or sheet, to a metal surface, and contemplates the application of cooling means and heating means to the plastic plate and metal plate, respectively, during the laminating process. When the heated metal plate is pressed against one surface of the plastic plate, as by any suitable press, the surface of the plastic contacted by the heated metal liquefies as increased pressure is applied to obtain a predetermined composite thickness. The heating means is then removed from the backing plate allowing the plate to cool and the liquefied contact surface to solidify forming a bonded unit.

One use to which such a composite printing plate embodying a plastic facing with a printing surface and a curved metallic backing is for attachment to a conventional rotary printing press. The plastic facing is extremely resistant to the stresses imposed by the printing operation and has a useful life comparable with the previously used metallic printing plate. It is apparent from the general description of the invention that with a laminated unit of this form the plastic facing is joined firmly to the metallic backing but may be readily removed by the simple application of heat and the backing reused.

Previous methods for securing the plate to the backing have been, for example, by some sort of cement. Such methods have proven unsatisfactory, primarily because cements have permitted either the plastic printing plate to shift relative to the backing or, where the cement crystallizes, it breaks loose under severe pounding to which the plate is subjected on the press.

A complete understanding of the invention may be obtained from the following detailed description of an apparatus forming a specific embodiment thereof, when read in conjunction with the appended drawings, in which.

Figure 1:
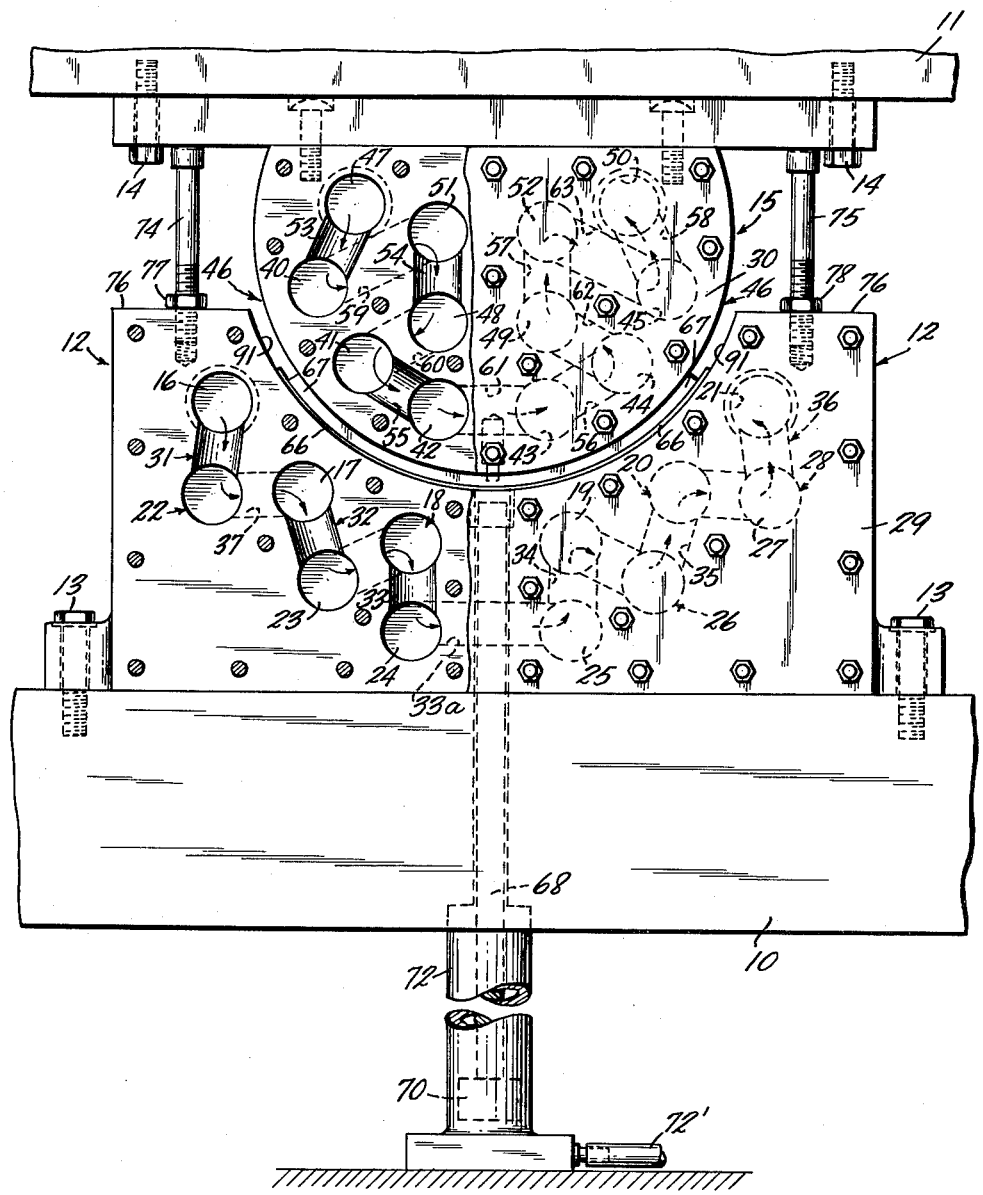
FIGURE 1 is an end view partly in section showing a matched set of curved dies in accordance with the present invention.

In carrying out the invention, a die 12 and a die 15 of a matched set are mounted on any suitable press as, for example, a hydraulic press. The press, for the purpose of this description, has a lower platen 10 and an upper platen 11, the lower plate 10 preferably being stationary although not necessarily so. The die 12 of the matched set is mounted on the fixed platen 10 by any suitable means as, for example, by threaded bolts 13. The other die 15 of the matched set is mounted on the movable platen 11 by any suitable means as, for example, by threaded bolts.

Since, in accordance with the present invention, the die 12 is to be maintained at a relatively cool temperature and the upper die 15 is to be heated, an important characteristic of the invention is the particular means for controlling these temperatures.

Referring first to the die 12, a plurality of substantially parallel conduit apertures, represented by the numerals 16 through 21, are arranged in a first series positioned in a spaced apart relation just below the molding surface 91 of the die 12 and in a second series, 22—28 of similar size just below the first series and spaced intermediate of the first series. Since all conduits are initially bored completely through the die, the ends of each conduit must be sealed. This is accomplished by the use of end plates 29 and 30 which are bolted over the ends of each die 12 and 15, respectively.

To provide communication between successive conduits, a channel 31 through 36 is formed between the ends of conduits 16 and 22, 17 and 23, 18 and 24, 25 and 19, 26 and 20, and 28 and 21, respectively. For example, these channels 31—36 are formed such that cooling fluid may flow through conduit 16 in the first series near the moulding surface 91, through an end channel 31 to a conduit 22 in the second series, through this conduit 22 to the opposite end, through a channel 37 in the opposite side of the die 12 to the next conduit 17, etc. In this manner the cooling fluid is threaded through successive conduits to maintain the die 12 at a predetermined temperature.

Figure 2:
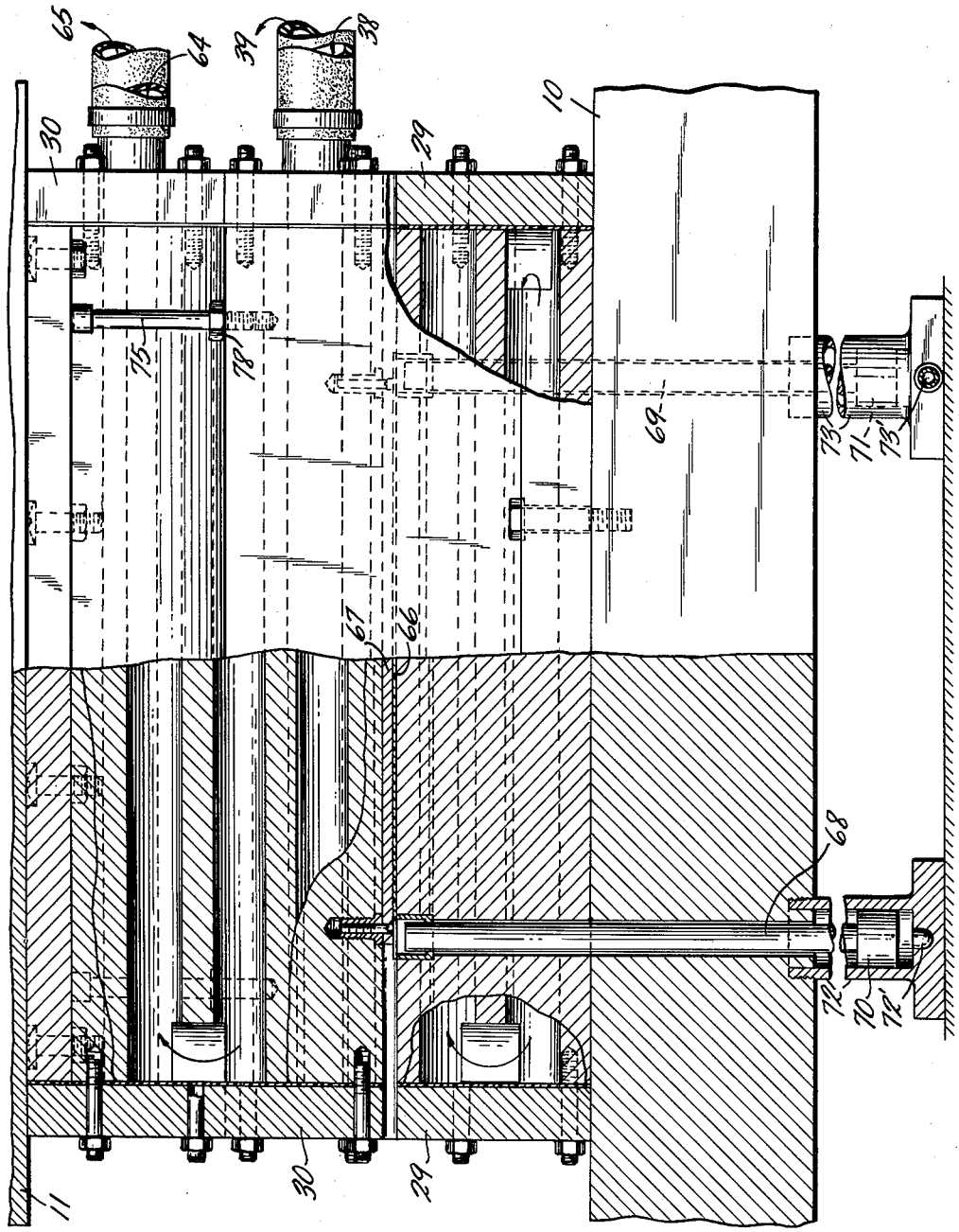
FIGURE 2 is a side elevation view partly in section showing the conduit means for circulating the temperature controlling fluid.

Connections for the input 38 and output 39 of this cooling fluid, as shown in FIGURE 2, are to the first and last conduits 16 and 21, respectively, in the first series. However, other connections may be made as, for example, the input 38 may be applied either directly to conduit 24, or, alternatively, to the middle of channel 33a which is approximately midway between the two end conduits 16 and 21. The cooling fluid will then divide in a parallel flow to the output 39 at each of the two end conduits 16 and 21. In some instances, this connection arrangement is preferred, particularly where it is found that the cooling fluid entering at one end absorbs too much heat by the time it reaches the output conduit at the opposite end to maintain the die at the desired temperature. A still further flow arrangement is obtainable by blocking the middle of channel 33a and applying dual inputs, one directly to the conduit 24 and another to the conduit 25. This input at conduit 24 would have an output at conduit 16, and the input at the conduit 25 would have an output at the conduit 21.

The die 15 is formed with conduits in a similar manner as the ones just described for the die 12. The principal distinction is that the arrangement of the conduits is somewhat varied. A first series includes a plurality of conduits 40 through 45 close to the molding surface 46 of the die 15 and a second and third series are positioned therebehind which include conduits 47 through 50 and 51 through 52, respectively. End channels 53—58 are formed in one end of the die 15 while end channels 59—63 are formed in the opposite end such that heating fluid may be circulated through successive conduits in order to heat the die 15 to a selected temperature. The input 64 and output 65 connections for this heating fluid may be varied in a manner similar to that described for the lower die. That is, the input may be connected to the center of the conduit arrangement rather than at one end, thereby dividing the heating fluid into a parallel flow with the output connections at the conduits 47 and 50. Here also, center channel 61 may be blocked and dual inputs applied to conduits 42 and 43, if desired. However, for the particular arrangement illustrated in FIGURE 1 of the drawing, the input 64 is connected to the conduit 47, the flow of the heating fluid passing through this conduit 47, through the end channel 53, through the next successive conduit 40 and the next channel 59, etc., until the output 65 is reached at the opposite end conduit 50.

A particular advantage is realized by this construction of the heating and cooling conduits and channel arrangement. That is, by providing the end channels within the body of the die between successive conduits, rather than by external loop connections, the greater quantity of heating or cooling fluid circulating near the end surface compensates for the larger exposed surface area there and maintains the temperature of the molding surface substantially uniform throughout its length. This is an important consideration when molding a printing plate which must be accurately, uniformly and securely bonded to the metallic backing.

The advantage contemplated by the circulation of cooling fluid through the conduits in the die 12 is that the lower surface of the plastic printing plate 66 must be kept hard while its opposite surface is liquefied in the bonding process. For a better bond, the surface of the metallic backing 67 may be roughened by anodizing, vapor blasting, or the like, if desired.

The plastic printing plate 66 is placed into the die 12 either as a preformed curved plate or in its original flat form. The metallic backing 67, FIGURE 1, is positioned against the die 15 prior to the laminating process in order to preheat the backing 67 before it is pressed against the plastic printing plate 66.

This metallic backing 67 is maintained in its position against the die 15 by rod members 68 and 69 located at each end, respectively, of the backing plate 67 as shown particularly in FIGURE 2. Each of these rods 68 and 69 is actuated by a long stroke cylinder 72 and 73 having pistons 70 and 71, respectively, which may be either of the air or hydraulic type.

To illustrate the operation of this holding means, it is assumed that the cylinders are air-operated. In such case, air is supplied at the lower ports 72' and 73' of the cylinders 72 and 73, respectively, thereby driving the piston rods 68 and 69 upwardly against the metallic backing 67 to hold it against the die 15. Conventional manual valves (not shown) are provided to retract the rods 68 and 69. However, in normal operation, no action by the operator is necessary. The retracting action is provided by the lowering movement of the die 15. As the piston rods 68 and 69 are pressed downwardly by the downwardly moving die 15, air is compressed in the cylinders containing the pistons and in the air conduits leading to the ports 72' and 73', but this does not hinder the movement of the die.

A significant feature of this laminating process is the provision of a means for maintaining accurately the thickness of the laminated unit. One such means is illustrated in FIGURE 1 of the drawings by a plurality of threaded bolts 74 and 75 on the upper surface 76 of the die 12. These bolts are threaded into the die 12 such that their height will represent the limit to which the downwardly moving platen 11 may travel. When the height of this bolt has been determined, it is locked into position by lock nuts 77 and 78 threaded against the upper surface 76 of the die 12.

In some instances, it has been found desirable to replace the threaded bolts stopping means 74 and 75 by electrical actuating switch means which, when actuated by the downwardly moving die 15 or by a suitable actuator attached thereto, will act to not only arrest this downward movement but to retract the upper platen 11. This stop means is provided when it is desired to have a completely automatic operation system.

Figure 6:
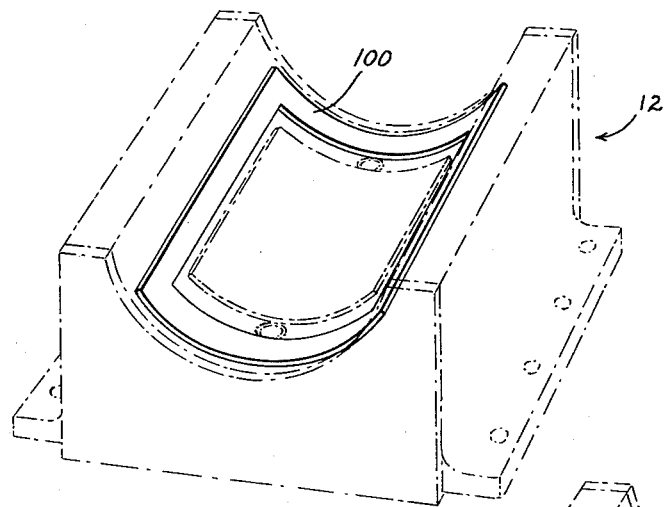
FIGURE 6 is a perspective of a picture-frame-like thickness gage plate in cooperatve relation with one of the curved dies.
Figure 7:
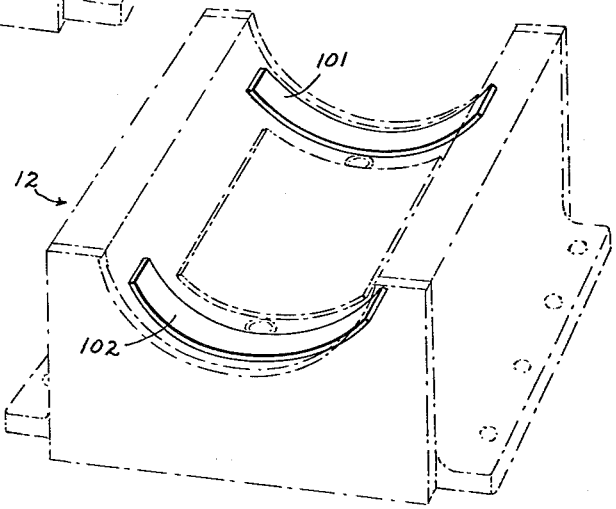
FIGURE 7 is a modification of the gage shown in FIGURE 6.
Figure 8:
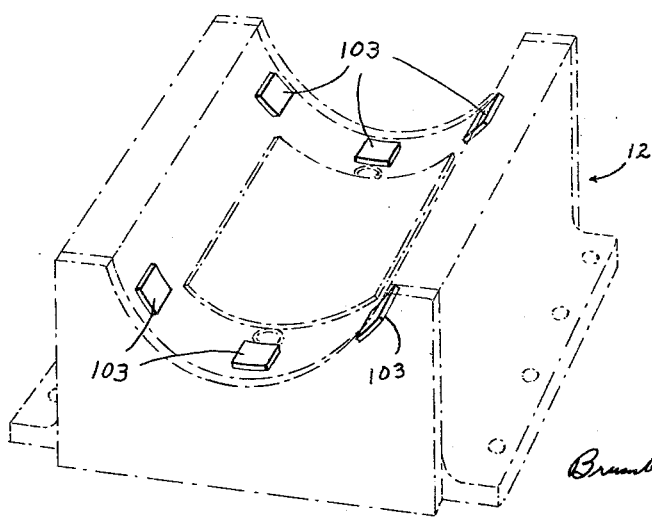
FIGURE 8 is a further modification of the gage shown in FIGURE 6.

Still another way to control the thickness of the finished product is to install a picture-frame-like plate 100, FIGURE 6, with a cut out portion suitable to receive the workpiece, which plate 100 is fitted into the lower die 12. Alternatives to this arrangement are shown by two bent strips 101 and 102 in FIGURE 7 and separate gage blocks 103 in FIGURE 8.

Figure 3:
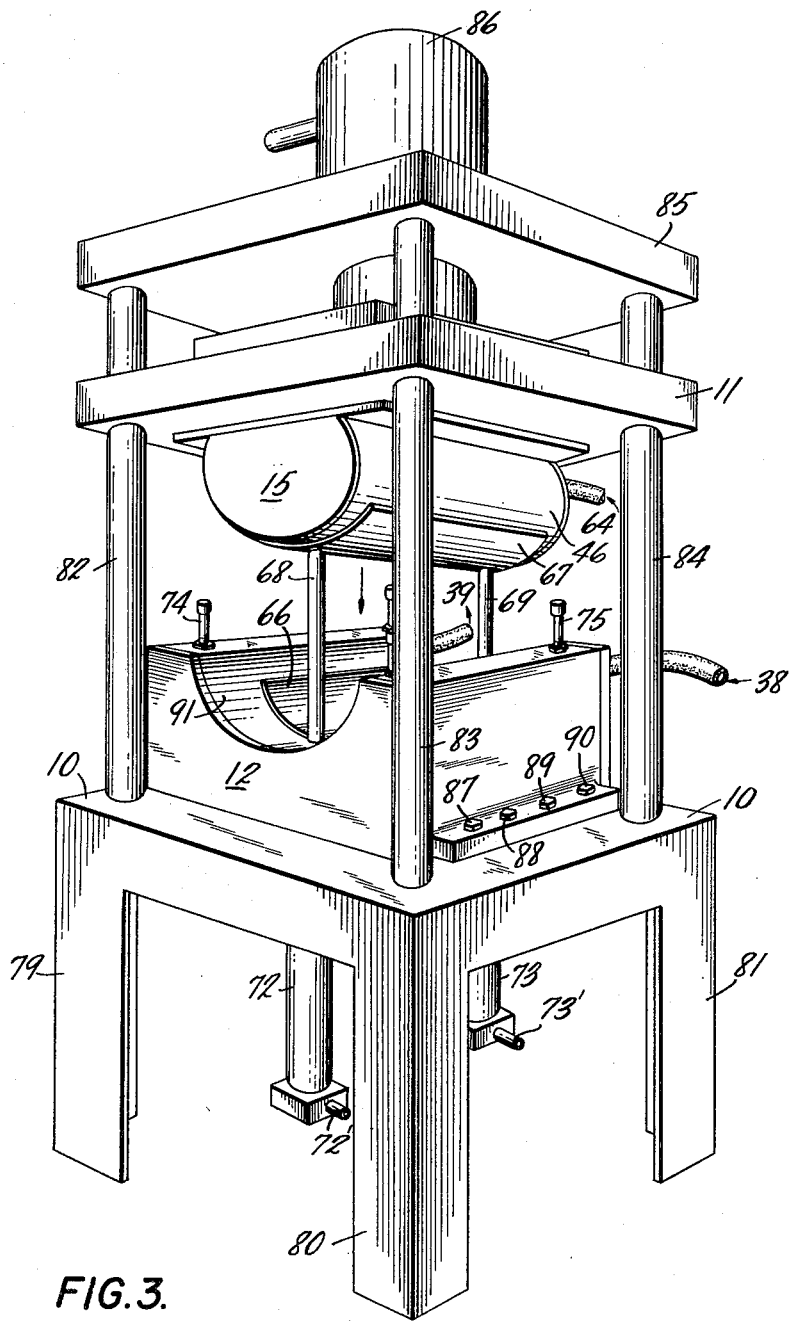
FIGURE 3 is a perspective view of a laminator press according to the principles of the invention.

To describe the process more clearly, reference is made to FIGURE 3 of the drawing wherein a perspective view of a structure in accordance with the principles of the invention shows the relative arrangement of parts necessary to carry out the purposes of the invention. A lower fixed platen 10 is supported in a raised position by a plurality of downwardly depending leg members 79, 80 and 81, one leg member not being visible. Symmetrically disposed about the fixed platen 10 is a plurality of posts 82, 83 and 84, one post not being visible, extending upwardly to support an upper surface 85 upon which is mounted a hydraulic actuator 86. Also, the posts 82—84 act as guide members for the upper movable platen 11. Mounted on the lower fixed platen 10 by a plurality of bolts 87—90 is a concave member 12 of a matching die set.

The convex member 15 of the matching die set is mounted on the lower side of the movable platen 11 in such a manner that it will cooperate with the concave member 12 of the die set as shown in FIGURE 3.

The material of which the matching die set is made is preferably of steel or cast iron. However, any other suitable hard material may be used.

The die member 12 is cooled to a temperature below the melting temperature of the plastic printing plate by circulating a suitable cooling fluid, such as water, through the input connection 38 and the output connection 39 shown attached to one end plate 29 of the die member 12. The die member 15 is heated by the passage of hot oil or the like through the connections 64 and 65 shown at the end plate 30 in FIGURE 3.

For illustrative purposes, a plastic composition particularly adaptable to this invention is preformed synthetic linear polyamides, commonly known as nylons and constituting a well recognized class of substances. Nylons are characterized by extreme hardness and good wearing qualities. Good results have been achieved in bonding nylon to a metallic plate by cooling the nylon to approximately 70° F. and heating the metallic plate to approximately 350° F. A total pressure of approximately 15,000 pounds was used to bond the nylon to a metallic plate. It is understood, however, that the invention is in no way limited to these specific figures or to these materials.

One complete operating cycle begins with the upper die member 15 in its raised position while a plastic printing plate 66 is inserted on the concave lower die member 12. Then a metallic backing plate 67 is placed against the upper die member 15 and held in position by rod members 68 and 69. These rod members 68 and 69 are actuated by pistons 70 and 71 located beneath the fixed platen 10 of the press. By the actuating means 86 of the press, the movable platen 11 is lowered to press the heated metallic backing plate 67 against the plastic printing plate 66. In this manner, the contact surface between the backing plate 67 and the plastic plate 66 is liquefied, causing the upper platen 11 to move even lower until it touches the stop members 74 and 75.

At this point, the upper movable platen 11 is raised quickly to remove the heating means from the backing plate 67. The rod members 68 and 69 are not actuated at this time permitting the backing plate 67 to remain in contact with the plastic printing plate 66 until the liquefied contact surface solidifies to form a bonded unit. Then the rod members 68 and 69 are actuated to raise the laminated unit from the lower die member 12 for easy removal. After removing the laminated unit from the press, this cycle may be repeated with another plastic printing plate and another metallic backing to continuously produce the printing plate blanks.

Figure 4:
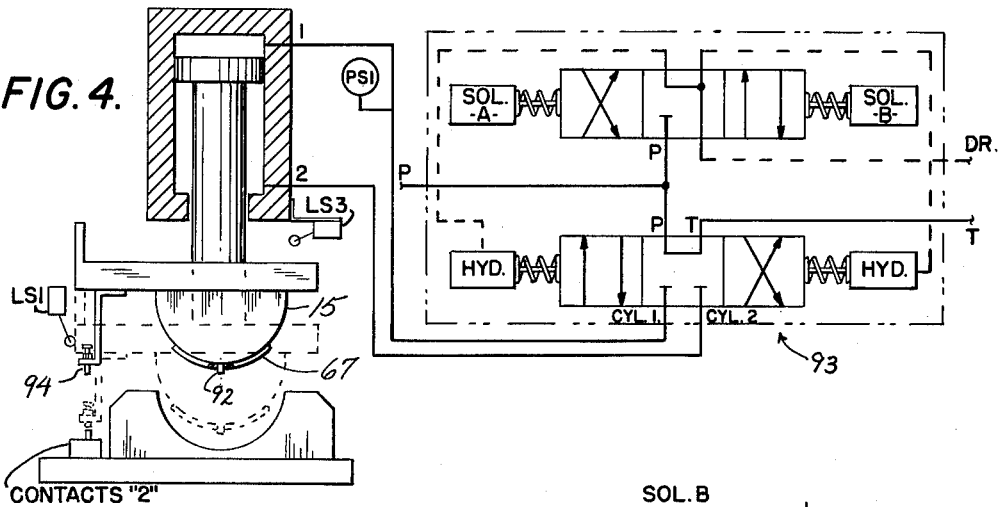
FIGURE 4 is a circuit diagram showing the hydraulic valve arrangement for actuating the laminator press of FIGURE 3.
Figure 5:
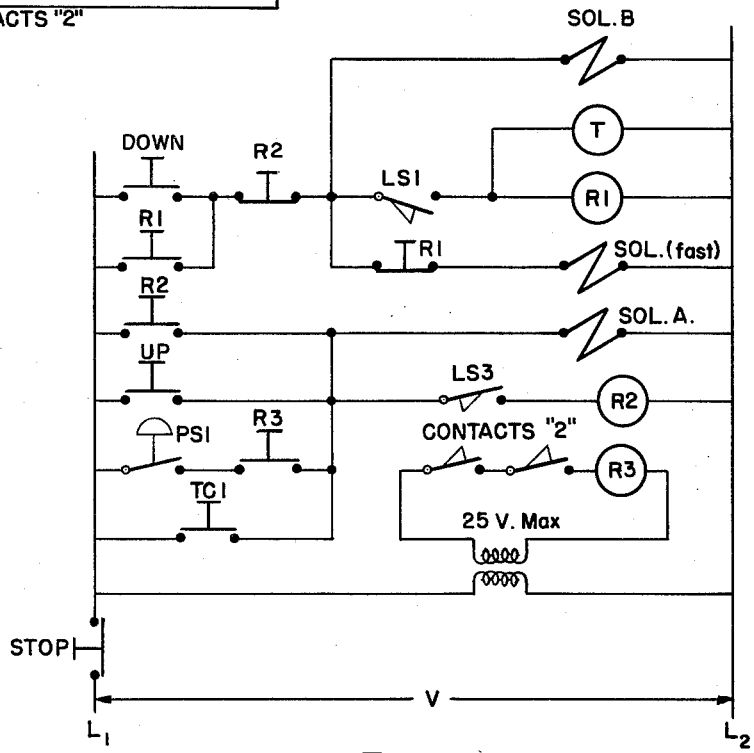
FIGURE 5 is an electrical circuit diagram for the control of the laminator press of FIGURE 3.

FIGURES 4 and 5 of the drawings illustrate one control system which is adaptable for operating the previously described apparatus. Describing, again, the operation of the apparatus this time referring particularly to FIGURES 4 and 5, the cycle is begun by the operator placing a metallic backing plate 67 manually against the upper die member 15. Positioning pins 92 are used to properly locate and align the plate 67. Then the operator actuates a manual valve (not shown) to raise the piston rods 68 and 69, shown in FIGURE 3, which hold the plate 67 up against the heated upper die member 15.

While the aluminum backup plate is thus being preheated, the operator loads the flexible nylon plate 66 in a thin, highly polished, curved liner (not shown) into the lower or female die. Next, the operator pushes the "down" button (shown in the across-the-line wiring diagram, FIGURE 5) and keeps it depressed to start the following sequence. Solenoid B is energized which, by means of hydraulic valve 93, begins to lower the hydraulic cylinder, and thus the upper die 15. Simultaneous with the energizing of solenoid B, solenoid "Fast" of a hydraulic throttle valve is energized opening up the throttle valve (not shown) wide, so that the liquid flow to and from the hydraulic cylinder is unrestricted and, therefore, the cylinder moves down rapidly. When the platen, in its downward movement, reaches the position where it actuates the limit switch LS1, the coil of relay R1 is energized. Holding contacts R1 are now closed, so the operator can let go of the "down" button, and the normally closed contacts R1 in series with the "Fast" solenoid are broken, de-energizing the "Fast" solenoid and thus slowing the downward movement of the hydraulic ram.

The slow downward movement continues until the laminated composite nylon and metal plates have reached the required caliber at which time contacts "2" of a microswitch are closed by adjustable actuator screw 94. There are two of these contacts "2" connected in a low voltage circuit in series as shown in FIGURE 5. These two contacts, or electrical switches, placed in spaced apart relation such that the composite is assured of being at a uniform thickness throughout. When both contacts are closed, relay R3 is energized, which in turn energizes solenoid A and opens the press.

If the hold up air cylinders have not been deflated, the rods 68 and 69 raise the now completely laminated plate up with the rising upper die 15. The operator now deflates the air cylinders manually by actuating a hand valve (not shown), which lowers rods 68 and 69 so that the plate can be removed.

A thirty minute timer is included in the circuit, whose function it is to open the press should it fail to reach caliber within thirty minutes. Also, a pressure switch marked "PSI" is in parallel with the normally open contacts of relay R3, so that the caliber and proper pressure must be simultaneously reached before the press will open.

At any time during the operation, the press can be opened by the operator pushing the "Up" button, or the downward or upward movement can be stopped by the operator pushing the "Stop" button.

It is to be understood that the above-described arrangements are simply illustrative of the application of the principles of the invention. Numerous other arrangements may be readily devised by those skilled in the art which will embody the principles of the invention and fall within the spirit and scope of the appended claims.

I claim:

1. In an apparatus for laminating a plastic printing member to a backing member, the combination comprising a first means for supporting said plastic printing member, an overhead second means for supporting said backing member, cooling means to maintain said first means at a temperature below the melting point of said plastic printing member, heating means to maintain said second means at a temperature above the melting point of said plastic printing member, retractable holding means to hold said backing member against said second means to preheat said backing member, and means to move said first and second means together to bond said plastic printing member to said backing member.

2. In an apparatus for laminating a plastic printing member to a metallic backing member, the combination comprising a first means for supporting a plastic printing member, an overhead second means for supporting a metallic backing member, cooling means to maintain said first means at a temperature below the melting temperature of said plastic printing member, heating means to maintain said second means at a temperature above the melting temperature of said plastic printing member, movable piston means to hold said metallic backing member against said second means to preheat said metallic backing member, and means to move said first and second means together to bond said plastic printing member to said metallic backing member.

3. In an apparatus for laminating a plastic printing plate to a metallic backing plate, the combination comprising a lower die for supporting a plastic printing plate, an upper die for supporting a metallic backing plate, cooling means to maintain said lower die at a temperature below the melting temperature of said plastic printing plate, heating means to maintain said upper die at a temperature above the melting temperature of said plastic printing plate, upstanding retractable holding means to hold said metallic backing plate against said upper die to preheat said metallic backing plate, means to move said lower and upper dies together to bond said plastic printing plate to said metallic backing plate, and stop means between said lower and upper dies to produce a laminated plastic printing plate and metallic backing plate unit of predetermined thickness.

4. In an apparatus for laminating a plastic printing plate to a metallic backing plate, the combination comprising a first lower die for supporting a plastic printing plate, a second upper die for supporting a metallic backing plate, hydraulic means for moving said second die toward said first die, a plurality of substantially parallel conduits through said first and said second dies for the circulation of temperature controlling fluid, channel means at each end of successive conduits such that said temperature controlling fluid may flow through successive conduits, connection means to said first die for circulating cooling means to maintain said first die at a temperature below the melting temperature of said plastic printing plate, connection means to said second die for the circulation of heating means to maintain said second die at a temperature above the melting temperature of said plastic printing plate, rod and piston means to hold said metallic backing plate against said second die to preheat said metallic backing plate, and stop means positioned between said first and said second dies such that the laminated plastic printing plate and metallic backing plate is of a predetermined thickness.

5. In an apparatus for laminating a plastic printing member to a backing member, the combination comprising a first means for supporting said plastic printing member, a second means for supporting said backing member, cooling means to maintain said first means at a temperature below the melting point of said plastic printing member, heating means to maintain said second means at a temperature above the melting point of said plastic printing member, means to hold said backing member against said second means to preheat said backing member, means to move said first and second means together to bond said plastic printing member to said backing member, electrical switch means associated with said first and second support means, and an electrical control means actuated by said electrical switch means to move said first and second support means apart.

6. In an apparatus according to claim 5 wherein said electrical switch means comprises at least two electrical switches positioned in spaced apart relation and connected such that said first and second support means are moved apart only after both of said electrical switches are actuated.

7. In an apparatus according to claim 6 wherein said electrical control means comprises first relay means to cause said first and second support means to move together rapidly until one of said electrical switches is actuated, and second relay means to cause said first and second support means to move together slowly until the second of said electrical switches is actuated.

8. An apparatus for laminating a heat-activatable plastic printing plate to a metal backing plate comprising relatively movable members having complementary convex and concave surfaces which cooperate to bond the printing plate to the metal backing plate, one of said members being above the other, means for cooling the concave surface to prevent heat-activation of the printing surface of the printing plate in contact therewith, means for heating the convex surface to heat the metal backing plate in contact therewith, and yieldable holding rods intermediate the convex and concave surfaces when they are in spaced apart positions for holding the appropriate plate in contact with the surface of the overhead member before the surfaces are brought together, but yielding to permit the surfaces to be brought together so as to bring the heated metal backing plate in contact with the heat-activatable printing plate.

9. An apparatus for laminating a heat-activatable plastic printing plate to a metal backing comprising a lower support having a concave surface for engaging the printing side of the printing plate, an overhead convexly curved member for receiving the metal backing in contact with the convex surface thereof, means for cooling the lower support to prevent heat-activation of the printing surface of the printing plate, means for heating the overhead convexly curved member, means for relatively moving the lower support and the overhead member toward and away from each other, adjustable stops separating the lower support and overhead member in operative position to prevent crushing of the printing plate, vertically movable holding rods upstanding from and guided for vertical movement in the lower support, the upper ends of the holding rods being engageable with the metal backing in contact with the overhead member to hold the metal backing against the convexly curved surface thereof while the lower support and the overhead member are spaced apart, thereby permitting the pre-heating of the metal backing before it is brought into contact with the printing plate, said holding rods being yieldable downwardly to permit the support and the overhead member to come together while at the same time supporting the metal backing in contact with the convexly curved surface and the overhead member.

References Cited in the file of this patent
UNITED STATES PATENTS

| | | |
|---|---|---|
| 1,398,142 | Novotny | Nov. 22, 1921 |
| 2,355,949 | Boutwell | Aug. 15, 1944 |
| 2,589,682 | Dudis | Mar. 18, 1952 |
| 2,686,552 | Faeber et al. | Aug. 17, 1954 |
| 2,687,762 | Faeber et al. | Aug. 31, 1954 |
| 2,726,974 | Lupton et al. | Dec. 13, 1955 |
| 2,789,500 | Reilly | Apr. 23, 1957 |
| 2,895,533 | Hefler et al. | July 21, 1959 |